United States Patent
Johnson

(10) Patent No.: US 6,927,555 B2
(45) Date of Patent: Aug. 9, 2005

(54) SLEEP MODE BATTERIES IN ELECTRONICS DEVICES AND METHODS THEREFOR

(75) Inventor: Robert Johnson, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 57 days.

(21) Appl. No.: 10/171,141

(22) Filed: Jun. 13, 2002

(65) Prior Publication Data

US 2003/0231002 A1 Dec. 18, 2003

(51) Int. Cl.$^7$ ................ H02J 7/00; G06F 1/26
(52) U.S. Cl. ...................... 320/134; 713/320
(58) Field of Search .................. 320/134, 128, 320/136, 127, 158, 163, 132; 324/426, 427; 713/323, 300, 320, 340; 429/91; 455/574

(56) References Cited

U.S. PATENT DOCUMENTS

| | | | | |
|---|---|---|---|---|
| 4,845,470 A | * | 7/1989 | Boldt, Jr. ................ 340/540 |
| 4,845,772 A | * | 7/1989 | Metroka et al. ............ 455/574 |
| 5,249,298 A | * | 9/1993 | Bolan et al. ................ 713/340 |
| 5,396,635 A | * | 3/1995 | Fung ........................ 713/323 |
| 5,534,366 A | * | 7/1996 | Hwang et al. ................ 429/91 |
| 5,590,343 A | * | 12/1996 | Bolan et al. ................ 713/300 |
| 5,892,959 A | * | 4/1999 | Fung ........................ 713/323 |
| 6,049,884 A | * | 4/2000 | Tsuji ........................ 713/323 |
| 6,072,250 A | * | 6/2000 | Thandiwe et al. .......... 307/150 |
| 6,144,186 A | | 11/2000 | Thandiwe et al. .......... 320/134 |
| 6,545,447 B1 | * | 4/2003 | Smith ........................ 320/132 |

* cited by examiner

Primary Examiner—Pia Tibbits
(74) Attorney, Agent, or Firm—Roland K. Bowler, II

(57) ABSTRACT

A battery-powered portable electronics device (100) including a switch interconnecting a battery (170) and the battery circuit (180), a battery-hibernation circuit (190) coupled to the switch, a portable electronics device power ON switch (192) coupled to a hibernation disable input of the battery-hibernation circuit, whereby the switch connects battery power to the battery circuit upon actuation of the portable electronics device power ON switch.

20 Claims, 3 Drawing Sheets

SLEEP MODE BATTERIES IN ELECTRONICS DEVICES AND METHODS THEREFOR

FIELD OF THE INVENTIONS

The present inventions relate generally to battery-powered electronics devices, and more particularly to batteries having hibernate or sleep mode circuits in electronics devices, for example rechargeable batteries with smart circuitry in wireless communications handsets, the inventions relate also to electronics devices incorporating sleep mode batteries, and methods therefor.

BACKGROUND OF THE INVENTIONS

Battery packs having smart circuitry, including battery fuel gauges and safety circuits, are used increasingly in portable electronics devices, for example, in cellular telephones, laptop computers, and in other portable electronics devices. The smart circuitry associated with these battery packs may however drain charge excessively from the batteries resulting in permanently reduced charge storing capacity. Uncharged batteries are particularly susceptible to damage from excessive discharge, for example discharge occurring during the time interval between manufacture and delivery to consumers. It is not uncommon for some products to remain in inventory for many months, up to one year or more, during which excessive discharge from smart circuits may occur.

In cellular telephone handsets, for example, the power-off current drawn by battery smart circuits may be substantial, at times exceeding 20 uA. This current will deeply discharge the battery over an extended time interval, possibly resulting in permanent damage to the battery.

Charging batteries before shipping reduces the tendency of battery circuits to become excessively discharged prior to delivery to end-users, but charging is burdensome on manufactures and suppliers.

The use of hibernation, or sleep, circuits in rechargeable battery packs to prevent excessive discharging is known generally. U.S. Pat. No. 6,072,250 entitled "Battery Pack Having Hibernate Circuit", for example, discloses a rechargeable battery pack having a hibernate circuit that is disabled upon user actuation of a dedicated mechanical switch disposed on the battery pack. U.S. Pat. No. 6,144,186 entitled "Low Power enable Circuit", discloses a rechargeable lithium ion battery pack that enters a sleep mode upon simulation of a low voltage, and exits sleep mode upon charging the battery.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

Figure 1:
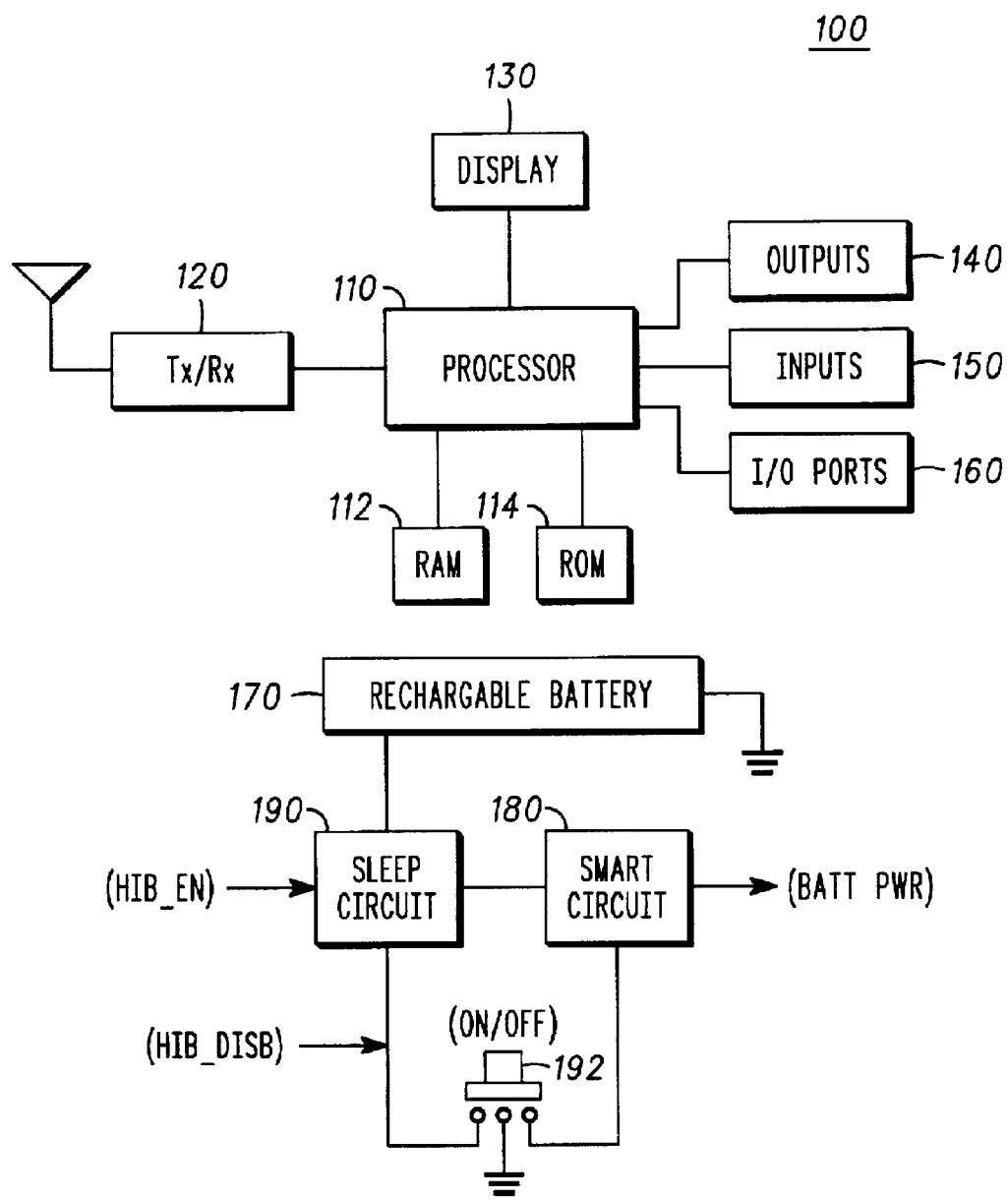
FIG. 1 is an electronics device having an exemplary rechargeable battery with a sleep circuit.

FIG. 1 is an exemplary electronics device with the form of a wireless communications device 100 comprising generally a processor 110 coupled to memory, for example to RAM 112, ROM 114, and sometimes an EPROM or other erasable memory, not shown. The exemplary wireless device 100 also includes a radio transceiver 120, a display 130, outputs 140, for example a sound and tactile outputs, inputs 150, for example a keypad, a microphone and video inputs, and I/O ports 160 coupled to the processor.

In other embodiments, the electronics device may be some other portable electronics device, for example, a laptop computer or personal digital assistance or a pager. More generally, the electronics device may be any other device that uses batteries, especially devices that use rechargeable batteries.

In FIG. 1, the exemplary wireless communications device 100 includes a rechargeable battery 170, which may be replaceable or permanently embedded in the device. In other embodiments, the battery is non-rechargeable, for example a disposable battery or an embedded non-rechargeable battery.

In FIG. 1, the exemplary battery has associated therewith a smart battery circuit 180, for example a fuel gauge and/or a safety circuit, or some other circuit that draws charge from the battery when the electronics device is powered OFF. The battery circuit 180 may be formed integrally with the battery, for example as part of a replaceable and/or rechargeable battery pack, or it may be a discrete circuit located separately from the battery, for example integrated on a circuit board of the device.

In FIG. 1, a battery-hibernation (sleep) circuit 190 is coupled to an output of the battery 170 and to the battery circuit 180. The battery-hibernation circuit 190 comprises generally a hibernation disable (HIB_DIS) input coupled to a power ON switch of the electronics device. The power ON switch provides electrical power to the device as discussed further below. The battery-hibernation circuit also comprises a hibernation enable (HIB_EN) input, which enables the hibernation circuit.

In battery-powered portable electronics devices having battery circuits that draw charge from the battery when the battery-powered electronics device is powered OFF, the hibernation circuit is enabled to disconnect the battery 170 from the battery circuit 180 or other circuit that draws charge from the battery. The battery-hibernation circuit may be enabled, for example, by a manufacturer during upon completion of assembly and any pre-ship product testing at the factory. In some embodiments, it may be desirable also to permit end-users to enable the hibernation circuit, for example from a configuration menu or from some other specified input on the electronics device or battery.

In FIG. 1, the exemplary power ON switch is a depressible ON/OFF switch 192 coupled to the battery circuit 180 and to the hibernation circuit 190. An output (BATT PWR) of the battery circuit 180 provides battery power to the electronics device, although the connections are not illustrated in FIG. 1. The battery-hibernation circuit is disabled upon actuating the power switch, for example when the end-user first applies power to the electronics device.

Figure 2:
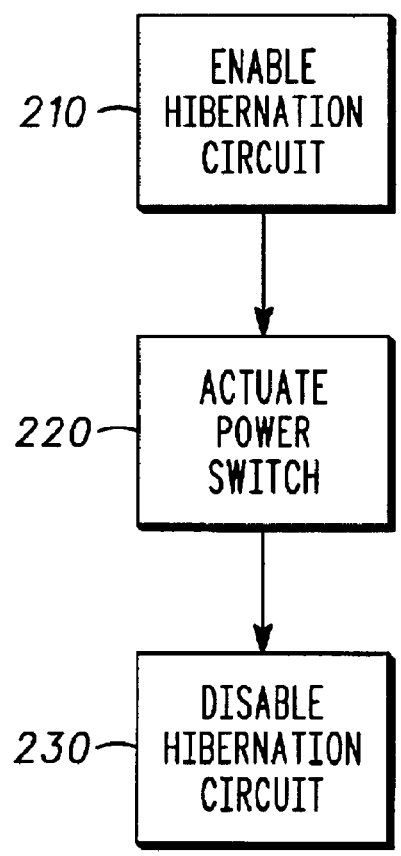
FIG. 2 is an exemplary process flow diagram for practicing the invention.

In FIG. 2, at block 210, in operation generally the battery-hibernation circuit is enabled as discussed above, thereby disconnecting the battery from any electrical circuit that draws power, or drains charge, from the battery. Thereafter, upon actuating the power ON switch, at block 220, the battery-hibernation circuit is disabled, at block 230, by re-connecting the battery to the electrical circuit that drains charge from the battery.

Figure 3:
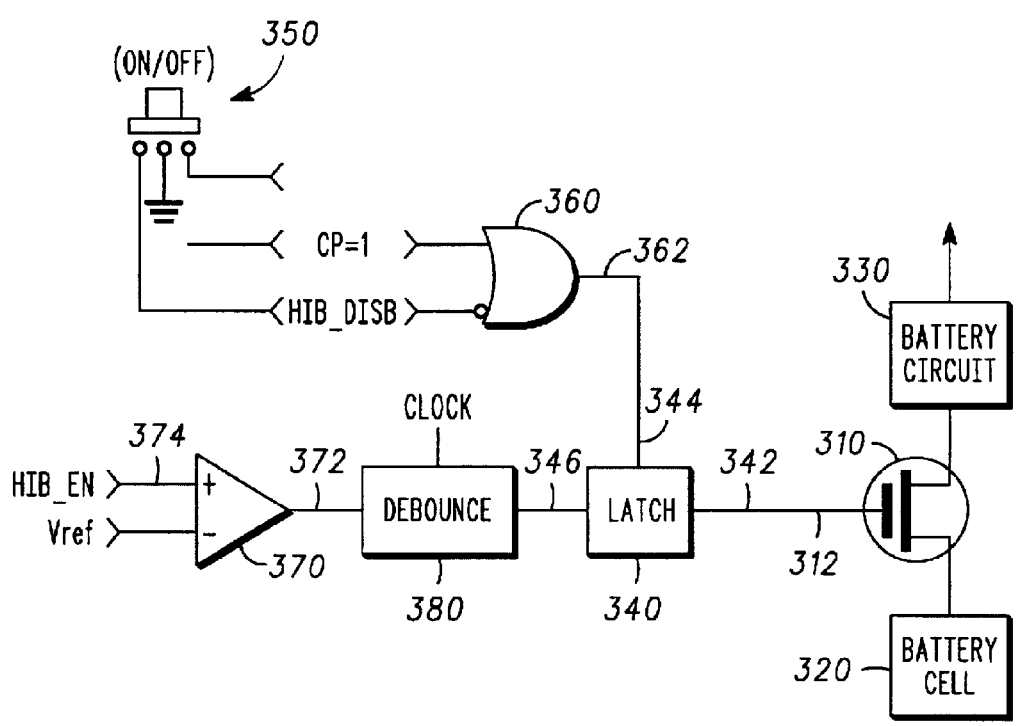
FIG. 3 is an exemplary battery-hibernation schematic circuit diagram.

In FIG. 3, a switch 310 is coupled to an output of one or more battery cells 320, which may be coupled in series or parallel, and to a battery circuit 330, which draws charge from the battery cells 320 when the device is power OFF. The exemplary switch 310 is a FET with sufficient current carrying capacity to accommodate the requirements of the particular electronic device application. The exemplary FET switch 310 includes a control input 312, and a source and drain, which are coupled to a corresponding one of the battery cell 320 and the battery circuit 330. In other embodiments, the switch may be some other suitable device, preferably one with a control input.

In the exemplary embodiment of FIG. 3, a latch circuit 340 having a latching output 342 is coupled to the control input of the switch 310. The exemplary latch circuit includes a switch closing input 344 coupled generally to a power ON switch 350 of the electronics device. The exemplary latch circuit 340 may comprise a flip-flop, although some other circuit with a latching output suitable for opening and closing the switch 310 may be used alternatively.

In FIG. 3, a hibernation disable circuit 360 interconnects the latch circuit 340 and the electronics device power ON switch 350. In the exemplary embodiment, the hibernation disable circuit is an OR logic gate having an output 362 coupled to the switch closing input 344 of the latch circuit 340. The exemplary OR logic gate has an inverting power hibernation disable bar input (HIB_DISB) that is coupled to a contact of the electronics device power ON switch 350. Actuation of the exemplary power switch 350, for example by depression thereof, provides at least a momentary ground contact for the power hibernation disable bar input (HIB_DISB) to the OR logic gate, thus producing an OR logic output to the latch circuit 340, which provides a latched signal on its output 342, thereby closing the switch 310 upon actuation of the power ON switch 350.

In FIG. 3, the latch circuit 340 also includes a switch opening input 346 coupled a hibernation enable circuit 370. The exemplary hibernation enable circuit 370 is a comparator. The hibernation enable circuit 370 includes a hibernation enable output 372 coupled to the latch circuit 340 and a hibernation enable input (HIB_EN) 374. Application of an enable signal to the hibernation enable (HIB_EN) input 374 greater than a reference signal (Vref) input applied to the exemplary comparator 370 produces a hibernation enable signal on the output of the hibernation enable circuit 370.

In some embodiments, a debounce circuit 380 with a clock input interconnects the output 372 of the hibernation enable circuit 370 and the switch opening input 342 of the latch circuit 340, thus providing sufficient signal duration to set the latch circuit. A debounce circuit, not illustrated in FIG. 3, may also be disposed between the hibernation disable circuit 360 and the latch circuit 340.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A battery-powered electronics device, comprising:
a battery;
a battery-hibernation circuit coupled to an output of the battery, the battery-hibernation circuit having a hibernation disable input;
an electronics device power ON switch coupled to the hibernation disable input of the battery-hibernation circuit.

2. The battery-powered electronics device of claim 1, the battery-hibernation circuit including a switch coupled to an output of the battery, the switch having a control input, a latch circuit having a latching output coupled to the control input of the switch, the latch circuit having a switch closing input coupled to the electronics device power ON switch.

3. The battery-powered electronics device of claim 2, a hibernation disable circuit interconnecting the switch closing input of the latch circuit and the electronics device power ON switch.

4. The battery-powered electronics device of claim 3, the hibernation disable circuit having a power switch enable input coupled to the electronics device power ON switch.

5. The battery-powered electronics device of claim 3, a hibernation enable circuits, the latch circuit having a switch opening input coupled to the hibernation enable circuit.

6. The battery-powered electronics device of claim 5, a debounce circuit interconnecting the hibernation enable circuit and the switch opening input of the latch circuit.

7. The battery-powered electronics device of claim 2, a battery circuit coupled to the output of the battery, the switch disposed between the output of the battery and the battery circuit, whereby the switch is closed upon actuation of the electronics device power ON switch.

8. A battery-powered portable electronics device, comprising:
a battery having a battery output;
a battery circuit;
a switch interconnecting the battery output and the battery circuit, the switch having a switch control input;
a battery-hibernation circuit having an output coupled to the switch control input, the battery-hibernation circuit having a hibernation disable input;
a portable electronics device power ON switch coupled to the hibernation disable input of the battery-hibernation circuit,
whereby the switch connects battery power to the battery circuit upon actuation of the portable electronics device power ON switch.

9. The battery-powered portable electronics device of claim 8, a latch circuit having a latching output coupled to the switch control input, the latch circuit having a switch closing input coupled to the portable electronics device power ON switch.

10. The battery-powered portable electronics device of claim 9, the portable electronics device power ON switch having a ground contact, the portable electronics device ON power switch having a hibernation circuit contact coupled to the switch closing input of the latch circuit, whereby the ground contact and the hibernation circuit contact are coupled at least momentarily upon actuation of the portable electronics device power ON switch.

11. The battery-powered portable electronics device of claim 10, a hibernation disable circuit interconnecting the switch closing input of the latch circuit and the hibernation circuit contact of the portable electronics device power switch.

12. The battery-powered portable electronics device of claim 8, the battery-hibernation circuit having a hibernation enable input, whereby the switch disconnects battery power to the battery circuit upon application of a hibernation signal to the hibernation enable input of the battery-hibernation circuit.

13. The battery-powered portable electronics device of claim 12, a latch circuit having a latching output coupled to the switch control input, the latch circuit having a switch closing input coupled to the portable electronics device power ON switch, the latch circuit having a switch opening input coupled to the hibernation enable input.

14. The battery-powered portable electronics device of claim 12, a debounce circuit interconnecting the switch opening input and the hibernation enable input.

15. The battery-powered portable electronics device of claim 8 is a wireless communications device having a radio transceiver and a display coupled to the battery output, the battery is a rechargeable battery.

16. A method in a battery-powered portable electronics device having a battery circuit that draws charge from a battery when the battery-powered portable electronics device is powered OFF, comprising:

disconnecting the battery circuit from the battery of the battery-powered portable electronics device by enabling a hibernation circuit;

disabling the battery hibernation circuit by actuating a power ON switch of the battery-powered portable electronics device.

17. The method of claim 16, disconnecting the battery circuit from the battery by opening a switch between an output of the battery and the battery circuit;

connecting the battery to the battery circuitry by closing the switch between the battery and the battery circuit when the power ON switch of the battery-powered portable electronics device is actuated.

18. The method of claim 17, opening and closing the switch by latching a control input of the switch.

19. The method of claim 16, applying power to the electronics device upon actuating the power ON switch of the battery-powered portable electronics device that disables the battery hibernation circuit.

20. The method of claim 16, the battery-powered portable electronics device is a wireless communications device, applying power to the electronics device upon actuating the power ON switch of the battery-powered portable electronics device that disables the battery hibernation circuit.

* * * * *